US008507089B2

(12) United States Patent
Nair et al.

(10) Patent No.: US 8,507,089 B2
(45) Date of Patent: *Aug. 13, 2013

(54) ARTICLES WITH POROUS PARTICLES FOR SECURITY PURPOSES

(75) Inventors: Mridula Nair, Penfield, NY (US); David F. Jennings, Penfield, NY (US); Tamara K. Jones, Rochester, NY (US); Joseph S. Sedita, Albion, NY (US); Myra T. Olm, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 248 days.

This patent is subject to a terminal disclaimer.

(21) Appl. No.: 12/984,055

(22) Filed: Jan. 4, 2011

(65) Prior Publication Data

US 2012/0167666 A1 Jul. 5, 2012

(51) Int. Cl.
*G03G 9/10* (2006.01)
*C04B 16/06* (2006.01)
*C04B 16/08* (2006.01)

(52) U.S. Cl.
CPC . *G03G 9/10* (2013.01); *C04B 16/08* (2013.01)
USPC .......................... 428/402; 428/407; 430/110.1

(58) Field of Classification Search
None
See application file for complete search history.

(56) References Cited

U.S. PATENT DOCUMENTS 4,833,060 A 5/1989 Nair et al.
4,965,131 A 10/1990 Nair et al.
5,385,803 A 1/1995 Duff et al.
5,450,190 A 9/1995 Schwartz et al.
5,972,027 A * 10/1999 Johnson ....................... 623/1.42
6,492,025 B1 12/2002 Chopra et al.
6,896,905 B2 * 5/2005 Blankenship et al. ........ 424/489
7,655,375 B2 2/2010 Yang et al.
7,662,535 B2 2/2010 Yang et al.
7,754,409 B2 7/2010 Nair et al.
2003/0002029 A1 1/2003 Dukler et al.
2003/0215394 A1 11/2003 Short et al.
2008/0176157 A1 7/2008 Nair et al.
2010/0021838 A1 1/2010 Putnam et al.
2010/0025476 A1 2/2010 Widzinski, Jr. et al.
2010/0155679 A1 6/2010 Olm et al.

FOREIGN PATENT DOCUMENTS

EP 2 025 525 2/2009
WO 2007/051035 5/2007

OTHER PUBLICATIONS

Shingo Okushima et al., "Controlled Production of Monodisperse Double Emulsions by Two-Step Droplet Breakup in Microfluidic Devices", *Am Chem Soc.* 2004 pp. 9905-9908.
U.S. Appl. No. 12/984,030, filed Jan. 4, 2011 entitled "Porous Particles With Multiple Markers" by Nair et al.
U.S. Appl. No. 12/984,044, filed Jan. 4, 2011 entitled "Preparation of Porous Particles With Multiple Markers" by Nair et al.

* cited by examiner

*Primary Examiner* — Alicia Chevalier
*Assistant Examiner* — Alexandre Ferre
(74) *Attorney, Agent, or Firm* — J. Lanny Tucker

(57) ABSTRACT

An article comprises one or more porous particles. Each porous particle comprises a polymer that provides a continuous solid phase including an external particle surface, and first and second discrete pores that are isolated from each other and dispersed within the continuous solid phase. The porous particle further comprises a first marker material present in the first discrete pores, and a second marker material that is detectably different from the first marker material and is present within the second discrete pores. The marker materials can provide a means for identifying documents, clothing, or other articles as genuine, and providing a detectable security system.

18 Claims, 1 Drawing Sheet

Number of Pixels
200
180
160
140
120
100
80
60
40
20
0
0 100 200
Code Value (0-255)

ARTICLES WITH POROUS PARTICLES FOR SECURITY PURPOSES

RELATED APPLICATIONS

Reference is made to copending and commonly assigned U.S. Ser. No. 12/984,030 (filed on even date herewith by Nair, Jennings, Jones, and Sedita and entitled POROUS PARTICLES WITH MULTIPLE MARKERS.

Reference is made to commonly assigned U.S. Ser. No. 12/984,044 now granted as U.S. Pat. No. 8,110,628.

FIELD OF THE INVENTION

This invention relates to articles or compositions having porous particles with detectably different marker materials that can be identified in a suitable manner for security purposes. It also relates to detection systems using the porous particles, and to methods of labeling articles for detection.

BACKGROUND OF THE INVENTION

Porous polymeric particles have been prepared and used for many different purposes. For example, porous particles have been described for use in chromatographic columns, ion exchange and adsorption resins, drug delivery devices, cosmetic formulations, papers, and paints. The methods for generating pores in polymeric particles are well known in the field of polymer science. However, each particular porous particle often requires unique methods for their manufacture. Some methods of manufacture produce large particles without any control of the pore size while other manufacturing methods control the pore size without controlling the overall particle size.

Marker materials can be used in porous particles so that the particles can be detected for a specific purpose. For example, U.S. Patent Applications 2008/0176157 (Nair et al.) and 2010/0021838 (Putnam et al.) and U.S. Pat. No. 7,754,409 (Nair et al.) describe porous particles and a method for their manufacture, which porous particles are designed to be toner particles for use in electrophotography. Such porous particles typically contain a colorant such as carbon black or another pigment to provide desired black-and-white or color electrophotographic images. Such porous particles ("toners") can be prepared using a multiple emulsion process in combination with a suspension process (such as "evaporative limited coalescence", ELC), and thereby provided reproducibly and with a narrow particle size distribution.

Still another important use of polymeric particles is as a means for marking documents, clothing, or lalbels as a "security" tag. For example, U.S. Pat. No. 5,385,803 (Duff et al. describes a process of authentication of documents using an electrophotographic process and core-shell toner particles containing an infrared emitting component and a detection step. U.S. Patent Application Publication 2003/0002029 (Dukler et al.) describes a method for labeling documents for authentication using a toner particle containing two or more mixed compounds having a characteristic detectable signal.

Product counterfeiting occurs in artworks, CD's, DVD's, computer software recorded on various media, perfumes, designer clothes, handbags, luggage, automobile and airplane parts, securities (for example stock certificates), identification cards (for example, drivers' licenses, passports, visas, and green cards), credit and debit cards, smart cards, and pharmaceuticals. The application of a security marker or taggant to an object or product for authenticating the origin or intended market is known in the art. Security markers can be incorporated into components that make up the object or product, or they can be incorporated into papers, inks, or varnishes that are applied to the object or product, or they can be incorporated into labels affixed to the object, product, or packaging there for. The presence of the security marker can be used to verify the authenticity of the origin of the object using suitable detection means that is specific to the security marker.

Some systems used for detecting the security markers are often known as "forensic" systems because they tend to require sophisticated equipment (for example high power microscopes) in a laboratory analysis. Other detection systems are designed for "field" use and are known as "covert" systems as they can be used outside the laboratory with specially designed equipment for the specific security markers being detected.

Some security markers can be dispersed within a carrier varnish and are referred to as particle-based or pigment-based markers. Such markers remain intact in the varnish and will appear as particles when examined microscopically. Other security markers are dissolvable in an ink or varnish and distributed in the carrier on a molecular level. These markers are not readily detected with a microscope and require more sophisticated detection equipment.

A means for detecting a population of microparticles is described in U.S. Pat. No. 5,450,190 (Schwartz et al.). Groups of microparticles of specific sizes and fluorescent properties or colors are mixed with toner particles and the resulting mixture is used in laser printer cartridges or photocopy machines to provide detectable images.

Particles having two or more different light emitting species can also be printed onto various substrates using various printing means, as described in WO 2007/051035 (Haushalter).

Toner particles having a luminescent material that includes quantum dots are described in EP 2,025,525 (Wosnick et al.) and can be used to form detectable markings on substrates. These toner particles can also include colorants or other detectable components.

While many "marked" particles and mixtures of such particles, having multiple marker materials, have been used for authentication, security (anti-counterfeiting), and electrophotographic purposes, there remains a need for a single "marked" particle that can have multiple marker particles. It is also desirable to have "marked" particles that are reproducibly prepared with controlled particle size and particle size distribution.

SUMMARY OF THE INVENTION

The present invention provides an article that comprises one or more porous particles, wherein each porous particle comprises a polymer that provides a continuous solid phase including an external particle surface, and at least first and second discrete pores that are isolated from each other and dispersed within the continuous solid phase, the first discrete pores comprising a first marker material, and the second discrete pores comprising a second marker material, wherein the first and second marker materials are detectably different.

This invention also provides a varnish or ink comprising one or more porous particles wherein each porous particle comprises a polymer that provides a continuous solid phase including an external particle surface, and at least first and second discrete pores that are isolated from each other and dispersed within the continuous solid phase, the first discrete pores comprising a first marker material, and the second discrete pores comprising a second marker material, which first and second marker materials are detectably different.

In addition, this invention provides a formed polymer or glass article that comprises one or more porous particles wherein each porous particle comprises a polymer that provides a continuous solid phase including an external particle surface, and at least first and second discrete pores that are isolated from each other and dispersed within the continuous solid phase, the first discrete pores comprising a first marker material, and the second discrete pores comprising a second marker material, which first and second marker materials are detectably different.

This invention also provides a method of labeling an article with detectable information comprising:

applying one or more porous particles to a substrate, wherein each porous particle comprises a polymer that provides a continuous solid phase including an external particle surface, and at least first and second discrete pores that are isolated from each other and dispersed within the continuous solid phase, the first discrete pores comprising a first marker material, and the second discrete pores comprising a second marker material, wherein the first and second marker materials are detectably different.

In addition, the present invention provides a system of detection comprising:

a detectable composition comprising one or more porous particles as described above, and an instrument for detecting one or both of the first and second markers in the porous particles.

The present invention provides a number of advantages. For example, it provides porous particles that can be designed to have one or more detectably different marker materials within the same particle. If there are two or more marker materials in discrete pores, these detectably different marker materials are isolated from each other in discrete pores to provide a unique signature that is different from a signature that is obtained by mere mixing of the marker materials in the same domain (for example, in the same pores). Such porous particles can be used in unique applications where different marker materials are needed for detection, authentication, or other purposes. Alternatively, mixtures of multiple types of porous particles can be designed in which each type of porous particle can have two or more detectably different marker materials that can additionally be manipulated by desired stimuli if desired. Furthermore, the porous particles can be designed to isolate reactive chemical components within separate pores of the same particle until such time as a "trigger" enables mixing of the isolated reactive components for a desired reaction.

We have found that such porous particles can be prepared using multiple water-in-oil emulsions. The porous polymer particle size, size distribution, pore sizes, and types of marker materials can be controlled by the amount and type of "porogen" used to create the pores, the fraction of the first or second water phase relative to the oil phase, the relative quantity and type of polymer used, the type of solvents, the type and amounts of stabilizers, and the type of shear that is used in dispersing one or more phases into the continuous solid phase, and the amount of water-in-oil emulsion in the third water phase used to form the multiple emulsion. It is also possible to make porous particles that are spherical or less than spherical for various advantages.

The porous particles containing the various distinct markers can be applied in labels, fibers, inks, or coatings on documents, clothing, wine bottles, or other articles for authentication or detection. Various detection systems can be used depending upon the marker materials used in the porous particles.

DETAILED DESCRIPTION OF THE INVENTION

Figure 2:
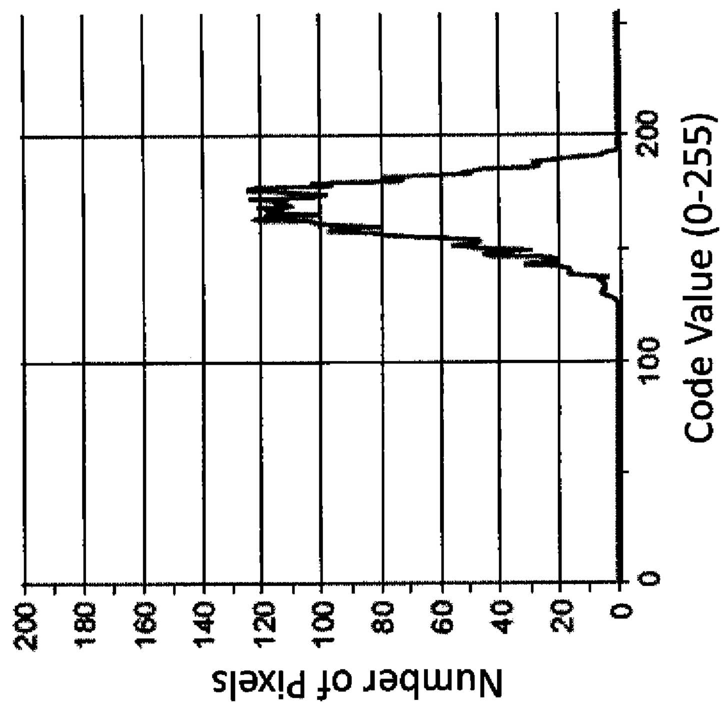
FIG. 2 is a graphical histogram for an individual porous particle prepared in Invention Example 8 below.

As noted above, the porous particles described herein can have various uses including but not limited to use in, chromatographic columns, ion exchange and adsorption resins, drug delivery devices, cosmetic formulations, pharmaceuticals, papers including securities, paints, inks, adhesives, electrophotographic toners, and security systems for detection of counterfeits, document authentication, and labeling of consumer goods (such as designer clothes, handbags, perfumes, and cosmetics). They can also be used in paper and plastic cards, for example driver's licenses, passports, and other identification cards. Moreover, the porous particles can be incorporated into packaging and packaging components such as fabrics, labels, films, fibers, tape, staples, foils, paperstock, and cardboard packing. The porous particles can also be included in varnishes (colored or colorless), inks, and other coating compositions, polymeric films and fibers, and formed polymer, glass, and ceramic articles including ceramic substrates, bottles, and bottle caps.

The porous particles are generally prepared, as described below, using multiple water-in-oil emulsions in combination with an aqueous suspension process, such as in the ELC process. Two or more water-in-oil emulsions can be originally prepared and used to provide two or more discrete pores in the porous particles.

The terms "porous particle" or "porous particles" are used herein, unless otherwise indicated, to refer to materials of the present invention. The porous particles comprise a continuous solid polymer binder phase having an external particle surface and discrete pores (at least first and second different discrete types of pores as defined below) dispersed within the continuous solid phase and first and second marker materials that are exclusively within the first and second discrete pores, respectively.

In many embodiments, the solid continuous polymer binder phase of the porous particles has the same composition. That is, the continuous solid phase is uniform in composition including any additives that may be incorporated into the polymer binder. In addition, if mixtures of polymers are used in the continuous solid phase, those mixtures are dispersed uniformly throughout.

The terms "detectably different" or "detectably distinct" refer to different marker materials (or different mixtures of marker materials described below) being detectable from each other using suitable detection means.

The term "porogen" refers to a pore forming agent used to make the porous particles. In this invention, a porogen can be the aqueous phase of the water-in-oil emulsions (that is the first and second aqueous phases), the pore stabilizing hydrocolloid, and any other additive in the aqueous phase that can modulate the porosity of the porous particles.

As used in this disclosure, the term "isolated from each other" refers to the first and second marker materials being in different (distinct) pores. In other words, the first marker material is only in certain (first) pores and the second marker material is present only in different (second) pores. Each of these sets of pores can include other marker materials or materials that do not behave as marker materials as long at the first and second marker materials are purposely not located within the same pores. Another way of defining this feature is that the first marker materials are in the first discrete pores exclusively and the second marker materials are in the second discrete pores exclusively.

The terms "first discrete pore" and "second discrete pore" refer to different isolated pores in the porous particle containing different marker materials. These first and second discrete pores can refer to distinct individual pores, or in most embodiments, they refer to distinct sets of pores. Each set of pores includes a plurality of pores, which pores are isolated from each other, and the pores of each set of pores are isolated from all other pores of the other sets of pores in the porous particle. The first discrete pores contain a first marker material and the second discrete pores contain a second marker material, and any additional discrete pores can contain still a different marker material. The word "discrete" is also used to define different droplets of the first and second aqueous phases when they are suspended in the oil (solvent) phase (described below).

The porous particles include "micro", "mesa", and "macro" pores, which according to the International Union of Pure and Applied Chemistry, are the classifications recommended for pores less than 2 nm, from 2 to 50 nm, and greater than 50 nm, respectively. The porous particles can include closed pores of all sizes and shapes (pores entirely within the continuous phase). While there may be open pores on the surface of the porous particle, such open pores are not desirable and can be present only by accident. The size of the porous particle, the formulation, and manufacturing conditions are the primary controlling factors for pore size. However, typically the first and second discrete pores independently have an average size of at least 20 nm and up to and including 4000 nm, or more likely at least 100 nm and up to and including 2000 nm. For spherical porous particles, this average size is an "average diameter". For non-spherical porous particles, the average size refers to the "average largest dimension". The discrete pores in the porous particles (for example, the first and second discrete pores) can have the same or different average sizes. Pore size can be determined by analyzing Scanning Electron Microscopy (SEM) images of fractured porous particles using a commercial statistical analysis software package to study the distribution of the pores within the porous particles, or by manually measuring the pore diameters using the scale in the SEM images. For example, the "average" pore size can be determined by calculating the average diameter of 20 measured pores.

The porous particles generally have a mode particle size of at least 2 μm and up to and including 75 μm, or typically at least 3 μm and up to an including 25 μm, with this mode particle size being measured by automated image analysis and flow cytometry using any suitable equipment designed for this purpose. The mode particle size represents the most frequently occurring diameter for spherical porous particles and the largest diameter for the non-spherical porous particles.

In general, the porous particles have porosity of at least 1% and up to and including 80%, or more likely at least 10% and up to and including 50%, or typically at least 10% and up to an including 30% to improve visualization of the marker particles in the porous particles, all based on the total porous particle volume. Porosity can be measured by the mercury intrusion technique.

The first and second discrete pores can also comprise first and second discrete pore stabilizing hydrocolloids, respectively, which compounds are described below. The first and second discrete pore stabilizing hydrocolloids can be the same or different compounds. In most instances, they are the same compound.

The porous particles of this invention can be spherical or non-spherical depending upon the desired use. Non-spherical porous particles can be advantageous for improved detection of the marker materials. The shape of porous particles can be characterized by an "aspect ratio" that is defined as the ratio of the largest perpendicular length to the longest length of the particle. These lengths can be determined for example by optical measurements using a commercial particle shape analyzer such as the Sysmex FPIA-3000 (Malvern Instruments). For example, porous particles that are considered "spherical" for this invention can have an aspect ratio of at least 0.95 and up to and including 1. For the non-spherical porous particles of this invention, the aspect ratio can be as low as 0.1 and up to and including 0.95, and in some embodiments, the aspect ratio can be 0.95 and down to and including 0.4.

As described above, the porous particles of many embodiments include two or more marker materials that are detectably different. For convenience, when two detectably different marker materials are included within a porous particle, they are labeled "first" and "second" marker materials to distinguish them. If additional detectably different marker materials are present in the same or different porous particles, they are labeled, "third", "fourth", "fifth", and so forth, marker materials.

As defined herein, the first marker material is present in a first discrete pore, a second marker material is present in a second discrete pore, and additional marker materials are present in additional discrete pores of the porous particle. These additional discrete pores can have an additional detectably different marker material, or at least some of the additional discrete pores are void (empty) of marker materials.

In some embodiments, either the first or second discrete pores contain a marker material but the other set of discrete pores are "empty" (no marker material).

In some other embodiments, the porous particles can have three or four additional discrete pores and each of these discrete pores has a detectably different marker material wherein at least two of the detectably different marker materials in the three or four additional discrete pores are detectably different from each other. Each of these markers in the three or four additional discrete pores is generally detectably different from all of the other marker materials in the porous particle (that is, different from the first and second marker materials).

In still other embodiments, the porous particles can have three or four additional discrete pores and they can have at least one more marker material than there are discrete pores, so that at least one discrete pore has two or more (multiple) marker materials.

The detectably different marker materials can be different colored dyes or pigments (or colorants), or metallic pigments, that are generally not water soluble. Such colorants can include but are not limited to, those described in U.S. Reissue Pat. No. 31,072 (Jadwin et al.) and in U.S. Pat. Nos. 4,160,644 (Ryan), and 4,416,965 (Sandhu et al.), 4,414,152 (Santilli et al.), such as carbon black, Aniline Blue, Calcoil Blue, Chrome Yellow, Ultramarine Blue, Du Pont Oil Red, Quinoline Yellow, Methylene Blue Chloride, Phthalocyanine Blue, Malachite Green Oxalate, Lamp Black, Rose Bengal, Pigment Red 48:1, Pigment Red 122, Pigment Red 57:1, Pigment Yellow 97, Pigment Yellow 12, Pigment Yellow 17, Pigment Blue 15:1, and Pigment Blue 15:3. Other useful colorants are described in U.S. Pat. No. 5,385,803 (Duff et al.) and EP 2,025,525 (Wosnick et al.) that are incorporated herein by reference. The marker materials can vary in water solubility although most have little water-solubility. Each marker material can include mixtures of colorants as long as the mixtures of marker materials in the porous particle are detectably different. Thus, either or both of the first and second marker materials can be mixtures of marker materials as long as the mixtures are detectably different.

Other classes of marker materials useful in the practice of this invention as first and second marker materials include but are not limited to, different fluorescing materials, radioisotopes, particles of metals and metal-containing compounds (such as metal oxides, metal sulfides, and metal oxyhydroxides) having different magnetic moments, luminescing compounds, as well as bioactive materials. Certain reactive chemicals can be used as markers and kept separate in discrete pores until their reaction is needed. Examples of such reactive chemicals include acids and bases, and isocyanates and amines.

Examples of useful fluorescing marker materials include but are not limited to, compounds that absorb radiation (excite) in the UV and visible regions of the electromagnetic spectrum but then emit or fluoresce in the infrared or visible region of the electromagnetic spectrum. Other useful fluorescing marker materials absorb radiation (excite) in the infrared region and also fluoresce in the infrared region. Still other fluorescing marker materials absorb (excite) in the infrared region and fluoresce in the visible region. Fluorescent light activated dyes can be invisible to or exhibit one color under ambient light conditions and a second color under fluorescent light conditions. Fluorescent dyes are known to the person skilled in the art. Examples of such compound include but are not limited to, coumarins, perylenes, naphthalimides, cyanines including metal phthalocyanines and metal naphthocyanines, xanthenes, oxazines, anthracene, naphthacene, anthraquinone, and thiazine dyes and derivatives thereof so as to make them water-soluble or water-dispersible.

Examples of useful emissive inorganic marker materials include but are not limited to, $CaWO_4$:Eu; $CaMoO_4$:Mn,Eu; BaFBr:Eu; $Y_2O_2S$:Tb; $Y_2O_2S$:Er,Yb; $Y_2O_2S$:Er; $Y_2O_2S$:Eu; $Y_2O_3$:Eu; $Y_2O_3S$:Eu+$Fe_2O_3$; $Gd_2O_2S$:Tb; $Gd_2O_2S$:Eu; $Gd_2O_2S$:Nd; $Gd_2O_2S$:Yb,Nd; $Gd_2O_2S$:Yb,Tm; $Gd_2O_2S$:Yb,Tb; $Gd_2O_2S$:Yb,Eu; LaOF:Eu; $La_2O_2S$:Eu; $La_2O_2S$:Eu,Tb; $La_2O_2S$:Tb; $BaMgAl_{16}O_{27}$:Eu; $Y_2SiO_5$:Tb,Ce; $Y_3Al_5O_{12}$:Ce; $Y_3Al_{2.5}Ga_{2.5}O_{12}$:Ce; $YVO_4$:Nd; $YVO_4$:Eu; $Sr_5(PO_4)_3Cl$:Eu; CaS:Eu; ZnS:Ag; $ZnSiO_4$:Mn; $CaSiO_3$:Mn; ZnS:Bi; (Ca,Sr)S:Bi; $(Zn,Mg)F_2$:Mn; $CaWO_4$; $CaMoO_4$; ZnO:Zn; ZnO:Bi; and $KMgF_3$:Mn.

Visible light emitting compounds that are excited by exposure to UV radiation can be used including rare earth emitting compounds that are described in numerous publications including WO2007/051035 (Haushalter) that is incorporated herein by reference.

Examples of useful radioisotope marker materials include but are not limited to, $^{32}P$, $^{3}H$, $^{14}C$, $^{41}Ca$, $^{57}Co$ and $^{59}Fe$.

Examples of useful metal and metal-containing marker materials with different magnetic moments include but are not limited to, particles of iron, nickel, cobalt, and gadolinium, as well as particles of metal oxides, metal sulfides, metal oxysulfides, and metal oxyhydroxides. Other metal-containing compounds that would be useful as marker materials would be readily apparent to a skilled artisan. While many metal marker materials are insoluble in water or organic solvents, other metal marker materials are colloidal or suspendible materials in water or organic solvents.

Examples of infrared (IR) radiation absorbing compounds include compounds that emit infrared radiation having a wavelength of at least 700 nm and up to and including 1500 nm when irradiated with light having a shorter wavelength. Such compounds include but are not limited to, metal phthalocyanines, vanadyl phthalocyanines, copper phthalocyanines, metal free phthalocyanines, azines dyes, chlorophylls, and laser dyes.

Luminescing compounds that have the capability of being illuminated upon exposure to activating radiation include those described in EP 2,025,525 (noted above).

Examples of chemicals that can be used as marker materials and can then react when mixed include but are not limited to isocyanates, amines, epoxies, carboxylic acids, hydroxyl compounds, silanes, silica, alumina and other such sols.

The various marker materials (including the first and second marker materials) can be present, independently, in an amount of up to and including 35 weight %, or at least 0.001 and up to and including 25 weight %, all based on total particle weight. A skilled worker would understand that the various types of marker materials can be present in different amounts, depending for example on the amounts needed for detectability or the relative amounts of the marker materials needed in a specific porous particle.

In some embodiments, the amount of the first marker material in relation to the amount of the second marker material is at a 1:2 to 2:1 weight ratio.

If the porous particles are to be used as toner particles in electrophotographic processes, the porous particles can also include one or more release agents such as waxes and lubricants. Examples of useful release agents are provided for example in U.S. Patent Application Publication 2008/0176157 (Nair et al.) that is incorporated herein by reference. Such compounds can be present in an amount of at least 0.1 and up to and including 20 weight % based on the porous particle dry weight.

In addition, such porous toner particles can also include one or more charge control agents (either negative or positive charge control agents). Examples of such compounds are also described in U.S. Patent Application Publication 2008/0176157 (noted above). They can be present in an amount of at least 0.1 and up to and including 5 weight %, based on the porous particle dry weight.

While in most embodiments, all of the pores in the porous particles contain one or the other marker materials, the porous particles can also include additional discrete pores besides the first and second discrete pores, and some of these additional discrete pores can have a marker material different from the first and second marker materials. Alternatively, at least some of these additional discrete pores have no marker material (they are void or "empty" of marker materials).

While the pores can be completely filled with the individual marker materials, it is also possible that only parts of the pores are filled with the marker materials. For example, at least one of the first and second marker materials is disposed on the inner wall of the respective first or second discrete pores, thereby leaving a void (unoccupied volume) within the interior of the first and second discrete pores, respectively.

In the embodiments of this invention comprising mixtures of different porous particles (for example, a mixture of first and second porous particles), the first and second polymeric binders (described below) form the continuous solid phases for these porous particles can be the same or different polymer compositions. In most embodiments, the first and second polymeric binders are the same polymer composition.

In addition, the mixture of first and second porous particles can include first, second, third, and fourth marker materials that are all different, or only three of the marker materials are different and two of the marker materials can be the same. Some discrete pores can contain multiple (two or more) marker materials.

In still other embodiments, the first and third marker materials are the same, and the second and fourth marker materials are different from all other marker materials.

The porous particles or mixtures of porous particles can be provided as powders, or as aqueous suspensions. Such aqueous suspensions can also include surfactants or suspending agents to keep the porous particles suspended.

The other compositional features of the porous particles are described in the following description of the desired method for preparing the porous particles. The polymers (that is binder polymers) and pore stabilizing hydrocolloids used to provide the continuous solid phase of the porous particles are described below.

The process for making the porous particles involves basically a four-step process (A through D). The first step (Step A) involves the formation of more than one water-in-oil emulsions. A first stable water-in-oil emulsion is formed, including a first aqueous phase comprising a first pore stabilizing hydrocolloid and a first marker material, dispersed in a suitable first oil (solvent) phase containing a first polymer that eventually helps form a continuous solid phase as a binder, which first polymer is dissolved in one or more organic solvents (described below). This first aqueous phase creates the first discrete pores in the porous particles.

A second stable water-in-oil emulsion is also formed to provide a second aqueous phase comprising a second pore stabilizing hydrocolloid and a second marker material dispersed in a suitable second oil (solvent) phase containing a second polymer that also eventually helps form a continuous solid phase as a binder, which second polymer is dissolved in one or more organic solvents. This second aqueous phase creates the second discrete pores in the porous particles. As described above, the second marker material is detectably different from the first marker material.

The first and second pore stabilizing hydrocolloids (described below) can be the same or different chemicals, or the same or different mixtures of chemicals. In most embodiments, they are the same chemicals. In addition, the first and second oil phases can comprise the same or different organic solvents (described below), or the same or different mixtures of organic solvents. In most embodiments, the first and second oil phases contain the same organic solvents. Further, the first and second polymers used in preparing the first and second oil phases can be the same or different compounds, or mixtures of compounds, but in most embodiments, they are the same polymer compound.

Suitable pore stabilizing hydrocolloids for preparing all of the emulsions described herein include both naturally occurring and synthetic, water-soluble or water-swellable polymers selected from the group consisting of cellulose derivatives [such for example, carboxymethyl cellulose (CMC) that is also referred to as sodium carboxymethyl cellulose], gelatin (for example, alkali-treated gelatin such as cattle bone or hide gelatin, or acid treated gelatin such as pigskin gelatin), gelatin derivatives (for example, acetylated gelatin and phthalated gelatin), proteins and protein derivatives, hydrophilic synthetic polymers [such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, and methacrylamide copolymers], water soluble microgels, polyelectrolytes [such as a polystyrene sulfonate, poly(2-acrylamido-2-methylpropanesulfonate), and a polyphosphate], and mixtures of any of these classes of materials.

In order to stabilize the initial water-in-oil emulsions so that they can be held without ripening or coalescence, it is desired that the pore stabilizing hydrocolloids in the aqueous phase have a higher osmotic pressure than that of the first and second oil phases depending on the solubility of water in the oil. This reduces the diffusion of water into the oil phases from the aqueous phases and thus the ripening caused by migration of water between the water droplets. One can achieve a higher osmotic pressure in the aqueous phase either by increasing the concentration of the pore stabilizing hydrocolloid or by increasing the charge on the pore stabilizing hydrocolloid (the counter-ions of the dissociated charges on the pore stabilizing hydrocolloid increase its osmotic pressure). It can be advantageous to have weak base or weak acid moieties in the pore stabilizing hydrocolloids that allow for their osmotic pressures to be controlled by changing the pH. Such pore stabilizing hydrocolloids are considered "weakly dissociating hydrocolloids". For these weakly dissociating hydrocolloids, the osmotic pressure can be increased by buffering the pH to favor dissociation, or by simply adding a base (or acid) to change the pH of the aqueous phase to favor dissociation. One example of such a weakly dissociating hydrocolloid is CMC that has a pH sensitive dissociation (the carboxylate is a weak acid moiety). For CMC, the osmotic pressure can be increased by buffering the pH, for example using a pH 6-8 buffer, or by simply adding a base to raise the pH of the aqueous phase to favor dissociation. For aqueous phases containing CMC, the osmotic pressure increases rapidly as the pH is increased from 4-8.

Other synthetic polyelectrolyte hydrocolloids such as polystyrene sulfonate (PSS), poly(2-acrylamido-2-methylpropanesulfonate) (PAMS), and polyphosphates are also useful pore stabilizing hydrocolloids.

For example, the first and second pore stabilizing hydrocolloids are the same or different and independently selected from the group consisting of carboxymethyl cellulose (CMC), a gelatin, a protein or protein derivative, a hydrophilic synthetic polymer, a water-soluble microgel, a polystyrene sulfonate, poly(2-acrylamido-2-methylpropanesulfonate), and a polyphosphate.

The pore stabilizing hydrocolloids are soluble in water, have no negative impact on multiple emulsification processes, and have no negative impact on melt rheology of the resulting porous particles that, for example, can be used as electrophotographic toners. The pore stabilizing compounds can be optionally crosslinked to minimize migration of marker materials to the particle outer surface, which migration can adversely affect various desired properties such as triboelectrification of porous particles designed to be used as electrophotographic toners. The amount of the first and second pore stabilizing hydrocolloids used to prepare the first and second emulsions (and any additional emulsions) will depend on the amount of porosity and size of pores desired and the molecular weight and charge of the pore stabilizing hydrocolloid that is chosen. For example, the first and second pore stabilizing hydrocolloids can be different in the first and second aqueous phases, resulting in porous particles having first discrete pores that are different in size from the second discrete pores. CMC is particularly useful as a pore stabilizing hydrocolloid in both first and second water-in-oil emulsions in an amount of at least 0.5 and up to and including 20 weight %, or at least 1 and up to and including 10 weight %, based on the total weight of first and second aqueous phases used in each emulsion.

The first and second aqueous phases used in forming the first and second water-in-oil emulsions can additionally contain, if desired, salts to buffer the emulsions and optionally to control the osmotic pressure of the aqueous phases. When CMC is used, for example, the osmotic pressure can be increased by buffering using a pH 7 buffer. The first and second emulsions can also contain additional pore forming agents such as ammonium carbonate.

The first and second polymers used in the first and second emulsions (or additional emulsions) to provide the continuous solid phase of the porous particles can be any type of binder polymer or binder resin that is capable of being dissolved in a suitable solvent (described below) that is immiscible with water wherein the polymer itself is substantially insoluble in water. Useful polymers include those derived from vinyl monomers such as styrene monomers and condensation monomers such as esters and mixtures thereof. Such polymers include but are not limited to, homopolymers and copolymers such as polyesters, styrenic polymers (for example polystyrene and polychlorostyrene), monoolefin polymers (for example, polymers formed from one or more of ethylene, propylene, butylene, and isoprene), vinyl ester polymers (for example, polymer formed from one or more of vinyl acetate, vinyl propionate, vinyl benzoate, and vinyl butyrate), polymers formed from one or more α-methylene aliphatic monocarboxylic acid esters (for example, polymers formed from one or more of methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate), vinyl ether polymers (such as polymers formed from one or more of vinyl methyl ether, vinyl ethyl ether, and vinyl butyl ether), and vinyl ketone polymers (for example, polymers formed from one or more of vinyl methyl ketone, vinyl hexyl ketone, and vinyl isopropenyl ketone). Particularly useful polymers include polystyrenes (including polymers of styrene derivatives), polyesters, styrene/alkyl acrylate copolymers, styrene/alkyl methacrylate copolymers, styrene/acrylonitrile copolymers, styrene/butadiene copolymers, styrene/maleic anhydride copolymers, polyethylene resins, and polypropylene resins. Other useful polymers include polyurethanes, urethane acrylic copolymers, epoxy resins, silicone resins, polyamide resins, modified rosins, paraffins, and waxes. Still other useful polymers are polyesters of aromatic or aliphatic dicarboxylic acids with one or more aliphatic diols, such as polyesters of isophthalic or terephthalic or fumaric acid with diols such as ethylene glycol, cyclohexane dimethanol, and bisphenol adducts of ethylene or propylene oxides. The acid values (expressed as milligrams of potassium hydroxide per gram of resin) of the polyester resins are generally in the range of from 2 to 100. The polyesters can be saturated or unsaturated.

Some embodiments of this invention include a mixture of first and second porous particles. The first porous particle comprises a first polymeric binder that provides a continuous solid phase including an external particle surface, and first and second discrete pores that are isolated from each other and dispersed within the continuous solid phase. The first porous particle further comprises first discrete pores comprising a first marker material, and second discrete pores comprising a second marker material, and the first and second marker materials are detectably different. The second porous particle comprises a second polymeric binder that provides a continuous solid phase including an external particle surface, and third and fourth discrete pores that are isolated from each other and dispersed within the continuous solid phase. The second porous particle further comprises third discrete pores comprising a third marker material exclusively, and fourth discrete pores comprising a fourth marker material exclusively, and the third and fourth marker materials are detectably different.

In such embodiments, the first and second polymers used as polymeric binders can be the same or different materials. In most instances, they are the same materials.

It is advantageous to utilize polymers in the porous particles that have a viscosity of at least 1 and up to and including 100 centipoise when measured as a 20 weight % solution in ethyl acetate at 25° C.

Any suitable organic solvent that will dissolve the binder polymer(s) and that is also immiscible with water can be used to prepare the first and second emulsions (or additional emulsions). Such organic solvents include but are not limited to, ethyl acetate, propyl acetate, chloromethane, dichloromethane, vinyl chloride, trichloromethane, carbon tetrachloride, ethylene chloride, trichloroethane, toluene, xylene, cyclohexanone, 2-nitropropane, dimethyl carbonate, and mixtures of two or more of these solvents. Ethyl acetate and propyl acetate are generally good solvents for many useful polymers while being sparingly soluble in water, and they are readily removed as described below by evaporation.

Optionally, the organic solvents that will dissolve the polymers and that is immiscible with water can be a mixture of two or more water-immiscible solvents chosen from the list given above. For example, the oil phase can comprise a mixture of one or more of the above organic solvents with a water-immiscible non-solvent for the polymer such as heptane, cyclohexane, and diethylether that is added in a proportion that is insufficient to precipitate the polymer prior to drying and isolation.

Depending upon the ultimate use of the porous particles, the first and second emulsions can also include various additives, generally that are added to the polymer prior to their dissolution in the organic solvent, during dissolution, or after the dissolution step itself. Such additives can include but are not limited to, colorants, charge control agents, shape control agents, compatibilizers, wetting agents, surfactants, plasticizers, and release agents such as waxes and lubricants, that are not within the pores as marker materials. Combinations of these materials can also be used. At least one of the first and second aqueous phases can include a buffering salt examples of which are readily known in the art.

The first and second emulsions (and any additional emulsions) used to prepare the porous particles can be prepared by any known emulsifying technique and conditions using any type of mixing and shearing equipment. Such equipment includes but is not limited to, a batch mixer, planetary mixer, single or multiple screw extruder, dynamic or static mixer, colloid mill, high pressure homogenizer, sonicator, or a combination thereof. While any high shear type agitation device is useful, a particularly useful homogenizing device is the Microfluidizer® such as Model No. 110T produced by Microfluidics Manufacturing operating at >5000 psi. In this device, the droplets of the first and second aqueous phases can be dispersed separately and reduced in size in the respective oil (organic) phases in a high flow agitation zone and, upon exiting this zone, the particle size of the dispersed aqueous phases is reduced to uniform sized dispersed droplets in each of the oil phases. The temperature of the process can be modified to achieve the optimum viscosity for emulsification of the droplets and to minimize evaporation of the oil phases.

Useful surface stabilizing agents include but are not limited to, stabilizer polymers such as poly(vinyl pyrrolidone) and poly(vinyl alcohol), inorganic stabilizers such as clay particles, colloidal silica (for example LUDOX™ or NALCO™), or polymer latex particles as described in modified ELC process described in U.S. Pat. Nos. 4,833,060 (Nair et al.), 4,965,131 (Nair et al.), 2,934,530 (Ballast et al.), 3,615,972 (Morehouse et al.), 2,932,629 (Wiley), and 4,314,932 (Wakimoto et al.), the disclosures of which are hereby incorporated by reference. Any combinations of these surface stabilizing agents can also be used.

The actual amount of surface stabilizing agent used in the method depends on the size of the final porous particles desired, which in turn depends upon the volume and weight ratios of the various phases used for making the multiple emulsions. While not intending to be limiting for this invention, the amount of surface stabilizing agent can be at least 0.1 and up to and including 10 weight %, or typically at least 0.2 and up to and including 5 weight %, based on the total weight of the water-in-oil-in-water emulsion and depending upon the particle size of the surface stabilizing agent (for example, colloidal or fumed silica particles) and the size of the oil droplets desired to be formed in the third step.

In the second step of the method (Step B) for preparing the porous particles, the first and second water-in-oil emulsions are combined to form a third water-in-oil emulsion containing a mixture of the first and second oil phases and distinct droplets of the first and second aqueous phases.

In some embodiments, a third oil phase (containing any of the organic solvents from the list of organic solvents described above) containing a third polymer (chosen from the list of polymers described above) can be combined with the first and second water-in-oil emulsions. The third polymer can be the same or different from the first and second polymers described above. The third oil phase containing the third polymer can be combined in this manner in any suitable amount in relation to the first and second water-in-oil emulsions, for example, but not limited to, a weight ratio of from 100:1 and to and including 1:100. The addition of the third oil phase allows the manufacture to use stock solutions of the first and second water-in-oil emulsions and to modify them as desired without having to make up fresh water-in-oil emulsions.

The first and second water-in-oil emulsions can be combined in any desirable weight ratio as long as at least one marker material is detectable. For example, in some embodiments, the weight ratio of the first water-in-oil emulsion to the second oil-in-water emulsion can be at least 1000:1 and to and including 0.01:1.

The third step (Step C) in the formation of the porous particles involves dispersing the third water-in-oil emulsion in a third aqueous phase that can contain a surface stabilizing agent to form a water-in-oil-in-water emulsion containing droplets of the third water-in-oil emulsion. These third water-in-oil emulsion droplets contain the distinct droplets of the first and second aqueous phases. In this third step, the third water-in-oil emulsion is dispersed within a third aqueous phase in the presence of a colloidal silica stabilizing agent to form a water-in-oil-in-water emulsion, containing an aqueous suspension of oil droplets of the third water-in-oil emulsion, wherein the oil droplets contain discrete smaller droplets of the first and second aqueous phases. The water-in-oil-in-water emulsion is subjected to shear or extensional mixing or similar flow processes (third step of the method), for example through a capillary orifice device to reduce the droplet size, yet above the particle size of the first and second water-in-oil emulsions and achieve narrow size distribution droplets through the limited coalescence process. The pH of the third aqueous phase is generally between 4 and 7 when colloidal silica is used as the stabilizing agent.

It can also be useful to add a shape control agent (described below) to the third aqueous phase, or alternatively, to at least one of the first and second oil phases.

The suspension of droplets of the first and second water-in-oil emulsions in the third aqueous phase, results in droplets of polymer(s) dissolved in oil containing the first and second aqueous phase as distinct finer droplets within the bigger polymer droplets that upon drying produce discrete porous domains in the resultant porous particles containing the polymer/resin(s) as a continuous solid phase.

Where the water-in-oil-in-water emulsion is formed in the third step, shear or extensional mixing or flow process is controlled in order to minimize disruption of the distinct droplets of the first and second aqueous phases in the mixture of first and second oil phases. Droplet size reduction is achieved by homogenizing the third emulsion through a capillary orifice device, or other suitable flow geometry. The shear field used to create the droplets in the third emulsion can be created using standard shear geometries, such as an orifice plate or capillary. However, the flow field can also be generated using alternative geometries, such as packed beds of beads, or stacks or screens that impart an additional extensional component to the flow. It is well known in the literature that membrane-based emulsifiers can be used to generate multiple emulsions. The techniques allow the droplet size to be tailored across a wider range of sizes by adjusting the void volume or mesh size, and can be applied across a wide range of flow rates. The back pressure suitable for producing acceptable particle size and size distribution is at least 100 and up to and including 5000 psi, or typically at least 500 and up to and including 3000 psi. The flow rate is generally at least 1000 and up to and including 6000 ml per minute, particularly when a capillary orifice device is used.

The final size of the porous particles and the final size of the pores of the porous particles can be impacted by the osmotic mismatch between the osmotic pressure of the first and second aqueous phases and the third aqueous phase. At each interface, the larger the osmotic pressure gradient present, the faster the diffusion rate where water will diffuse from the lower osmotic pressure phase to the higher osmotic pressure phase depending on the solubility and diffusion coefficient in the oil (organic) phase. If the osmotic pressure of the third aqueous phase is higher than the first and second aqueous phases, then the water will migrate out of the pores of the particle and reduce the porosity and pore size. In order to maximize porosity, one can tailor the osmotic pressures so that the osmotic pressure of the third aqueous phase is lower, than the osmotic pressure of the first and second aqueous phases. Thus, water will diffuse following the osmotic gradient from the third aqueous phase into the first and second aqueous phases swelling the size of the distinct droplets of the first and second aqueous phases thereby increasing the final porosity and pore size. This osmotic shock is desirably created after the homogenization of the water-in-oil-in-water emulsion to minimize disruption of the distinct droplets of the first and second aqueous phases.

If it is desirable to have small pores and maintain the initial small drop size formed in the making of the first and second emulsions, the osmotic pressure of both the interior and exterior aqueous phase can be matched, or have only a small osmotic pressure gradient. Depending on the osmotic pressure of each of the first and second aqueous phases and their values relative to the third aqueous phase, the resulting discrete pores can have different average sizes.

The fourth step (Step D) in the preparation of the porous particles includes removal of the first and second organic solvents of the oil phases that are used to dissolve the polymer so as to produce an aqueous suspension of uniform particles containing discrete domains of marker materials. Removal of the organic solvents provides precursor porous particles that are then subjected to isolation and drying techniques (Step E) to provide the porous particles. The details of this process depend upon the water solubility and boiling points of the organic solvents in the oil phases relative to the temperature of the drying process. Generally, however, organic solvents can be removed by evaporation using removal apparatus such as a rotary evaporator or a flash evaporator. The porous particles can then be isolated from the precursor porous particles after removing the organic solvents by filtration or centrifugation, followed by drying for example in an oven at 40° C. that also removes any water remaining in the pores. Optionally, the porous particles can be treated with alkali to remove any silica surface stabilizer.

Optionally, between the third and fourth steps, additional water can be added to the water-in-oil-in-water emulsion. This intermediate step can be carried out to increase the size of the pores by creating a osmotic pressure mismatch between the first and second aqueous phases as described above.

Alternatively, in the method for preparing the porous particles, one or more of the first and second oil phases that eventually form a continuous solid phase, can be replaced with one or more ethylenically unsaturated polymerizable monomers and a polymerization initiator to form a water-in-oil-in-water emulsion for example using a limited coalescence process. The ethylenically unsaturated polymerizable monomers in the emulsified mixture can be polymerized in the fourth step, for example through the application of heat or radiation (for example actinic or IR radiation) after the third step (described above). The optional organic solvent can be present in such small amounts and have sufficient solubility in water that it can be removed by washing with water. This washing can occur simultaneously with a filtration process. The resulting suspension polymerized precursor porous particles can be isolated and dried as described earlier to yield porous particles of this invention. In addition, the mixture of water-immiscible ethylenically unsaturated polymerizable monomers can contain polymers as described above. Useful ethylenically unsaturated polymerizable monomers and polymerization initiators would be readily apparent to one skilled in the art.

Thus, in some embodiments the method for preparing a porous particle comprises the steps of:

A) providing:

a first water-in-oil emulsion comprising a first pore stabilizing hydrocolloid and a first marker material in a first aqueous phase that is dispersed in a first oil phase containing a first polymer or at least one first ethylenically unsaturated polymerizable monomer, a first polymerization initiator, and a first organic solvent, and a second water-in-oil emulsion comprising a second pore stabilizing hydrocolloid and a second marker material in a second aqueous phase that is dispersed in a second oil phase containing a second polymer or at least one second ethylenically unsaturated polymerizable monomer, a second polymerization initiator, and a second organic solvent, the second marker material being detectably different from the first marker material, provided that at least one of the first and second water-in-oil emulsions contains an ethylenically unsaturated polymerizable monomer and a polymerization initiator, B) combining the first and second water-in-oil emulsions to form a third water-in-oil emulsion containing a mixture of the first and second oil phases and distinct droplets of the first and second aqueous phases, C) dispersing the third water-in-oil emulsion in a third aqueous phase containing a surface stabilizing agent to form a water-in-oil-in-water emulsion containing droplets of the third waiter-in-oil emulsion, which third water-in-oil emulsion droplets contain the distinct droplets of the first and second aqueous phases, and D) polymerizing the ethylenically unsaturated polymerizable monomers, to form a solidified precursor porous particle having a continuous solid phase including an external particle surface, and first and second discrete pores being isolated from each other and dispersed within the continuous solid phase, removing, if present, the first and second organic solvents of the first and second oil phases from the water-in-oil emulsion, and isolating the precursor porous particles to provide porous particles, the porous particle further comprising the first discrete pores comprising the first marker material, and the second discrete pores comprising the second marker material.

If desired, removal of the first and second organic solvents, if present, of the first and second oil phases from the water-in-oil emulsion can be carried out after step C but before the polymerizing of step D.

The shape of the porous particles can be modified if necessary for improved visualization of the marker materials using microscopic techniques and to control the electrostatic toner transfer and cleaning properties where such properties have been found to improve as the spherical nature (sphericity) of the particles is reduced (for example, an aspect ratio of less than 0.95, or an aspect ratio of from 0.4 and up to and including 0.95). In the method used to prepare the porous particles, additives (shape control agents) can be incorporated into the first or second aqueous phases, in the first or second oil (organic) phase or in the third aqueous phase to modify the shape, aspect ratio or morphology of the porous particles. The shape control agents can be added after or prior to forming the water-in-oil-in-water emulsion. In either case, the interfacial tension at the oil and third water interface is modified before solvent is removed, resulting in a reduction in sphericity of the particles. Some useful shape control agents are quaternary ammonium tetraphenylborate salts described in U.S. Patent Application Publication 2007/0298346 (Ezenyilimba et al.), metal salts described in U.S. Patent Application Publication 2008/0145780 (Yang et al.), carnauba waxes described in U.S. Pat. No. 5,283,151 (Santini), SOLSPERSE® hyperdispersants as described in U.S. Pat. No. 5,968,702 (Ezenyilimba et al.), metal salts as described in U.S. Pat. No. 7,655,375 (Yang et al.), and zinc organic complexes as described in U.S. Pat. No. 7,662,535 (Yang et al.). All of these publications are incorporated herein by reference. The more desirable shape control agents are polyethyloxazoline, fatty acid modified polyesters such as EFKA® 6225 and EFKA® 6220 from Ciba BASF, and phosphate esters of alkoxylated phenols such as SynFac 8337.

Particles that are not perfectly spherical can be useful to improve the visualization of the marker materials in the porous particles. Thus, useful non-spherical porous particles have an aspect ratio of less than 0.95 and typically less than 0.9 and as low as 0.1.

If the porous particles are to be used as toner particles, they can also contain flow aids in the form of surface treatments that are typically in the form of inorganic oxides or polymeric powders with typical particle sizes of at least 5 nm and up to and including 1000 nm. With respect to the surface treatment agent also known as a spacing agent, the amount of the spacing agent on the porous particles is an amount sufficient to permit the porous toner particles to be stripped from carrier particles in a two component dry developer by the electrostatic forces associated with the charged image or by mechanical forces. Useful amounts of the spacing agent are at least 0.05 and up to and including 10% percent or typically at least 0.1 and up to and including 5% percent, based on the weight of the porous toner particle. The spacing agent can be applied to the surfaces of the porous particles by conventional surface treatment techniques such as, but not limited to, conventional powder mixing techniques. A useful spacing agent is silica, such as those commercially available from Degussa, like R-972, or from Wacker, like H2000. Other suitable spacing agents include, but are not limited to, other inorganic oxide particles and polymer particles such as titania, alumina, zirconia, and other metal oxides, and polymer particles less than 1 μm in diameter such as particles of acrylic polymers, silicone-based polymers, styrenic polymers, fluoropolymers, and copolymers thereof.

It should be understood from the description for providing porous particles having first and second discrete particles, that the method for making these particles can be modified or expanded to incorporate additional discrete pores. To accomplish this, for example, the method of described herein can further comprise combining:

one or more additional water-in-oil emulsions, each comprising a pore stabilizing hydrocolloid in one or more additional aqueous phases that are dispersed in one or more additional oil phases each, and each oil phase containing a polymer, with the first and second water-in-oil emulsions in step B so that the third water-in-oil emulsion contains distinct droplets of the first, second, and the one or more additional aqueous phases.

In some embodiments of this method, at least one of the additional water-in-oil emulsions contains a marker material. Alternatively, at least one additional water-in-oil emulsion contains no marker materials. In still other embodiments, at least one of the first or second water-in-oil emulsions contains multiple marker materials.

The porous particles of this invention can also be prepared using a method comprising the steps of:

A) providing:

a first water-in-oil emulsion comprising a first pore stabilizing hydrocolloid and a first marker material in a first aqueous phase that is dispersed in a first oil phase containing a first polymer and a first organic solvent, and a second water-in-oil emulsion comprising a second pore stabilizing hydrocolloid in a second aqueous phase that is dispersed in a second oil phase containing a second polymer and a second organic solvent, B) combining the first and second water-in-oil emulsions to form a third water-in-oil emulsion containing a mixture of the first and second oil phases and distinct droplets of the first and second aqueous phases, C) dispersing the third water-in-oil emulsion in a third aqueous phase containing a surface stabilizing agent to form a water-in-oil-in-water emulsion containing droplets of the third water-in-oil emulsion, which third water-in-oil emulsion droplets contain the distinct droplets of the first and second aqueous phases, and D) removing the first and second organic solvents of the oil phases from the water-in-oil-in-water emulsion to form solidified precursor porous particles comprising the first and second polymers that provides a continuous solid phase comprising the first and second polymers and including an external particle surface, and first and second discrete pores that are isolated from each other and dispersed within the continuous solid phase, and isolating the precursor porous particles to provide porous particles, the porous particle further comprising the first marker material that is present exclusively within the first discrete pores.

In this method, it is particularly useful to provide porous particles having an aspect ratio of 0.4 to 0.95 by including a surface control agent such as a quaternary ammonium tetraphenylborate salt, metal salt, carnauba wax, or zinc organic complex in the first, second, or third aqueous phase or in the first or second oil phase.

Thus, articles of this invention can be labeled with detectable information by incorporating one or more porous particles described herein into a material, or applying one or more porous particles to a substrate. For example, the one or more porous particles can be applied to the substrate in a varnish or ink. Alternatively, the one or more porous particles can be applied to the substrate in a paper or plastic label. Such a substrate can be a paper or identification card. In addition, the one or more porous particles can be introduced into a material or applied to the substrate in a pattern. Moreover, the substrate can be a fiber or fabric.

Various instruments can be used to detect the marker materials in the porous particles. The instrument to be used will depend upon the particular marker materials that are used and would be readily apparent to one skilled in the art. For example, some marker materials can be detected using field microscopes, or by using high powered laboratory microscopes.

The present invention provides at least the following embodiments and combinations thereof, but other combinations of features are considered to be within the present invention as a skilled artisan would appreciate from the teaching of this disclosure:

1. An article that comprises one or more porous particles wherein each porous particle comprises a polymer that provides a continuous solid phase including an external particle surface, and at least first and second discrete pores that are isolated from each other and dispersed within the continuous solid phase, the first discrete pores comprising a first marker material, and the second discrete pores comprising a second marker material, which first and second marker materials are detectably different.

2. The article of claim 1 that is a fabric, label, film, fiber, paper or plastic card, paperstock, packaging component, or polymer, ceramic, or glass article.

3. The article of embodiment 1 or 2 comprising a coating composition comprising the one or more porous particles.

4. The article of any of embodiments 1 to 3 wherein the first and second marker materials are independently selected from the groups consisting of colored pigments or dyes, fluorescing materials, radioisotopes, luminescing compounds, particles of metal or metal-containing compounds having a magnetic moment, and bioactive materials.

5. The article of any of embodiments 1 to 4 wherein the porous particle further comprises additional discrete pores besides the first and second discrete pores.

6. The article of embodiment 5 wherein at least some of the additional discrete pores have no marker materials.

7. The article of any of embodiments 1 to 6 wherein the first and second discrete pore stabilizing hydrocolloids are the same or different and are independently selected from the group consisting of carboxymethyl cellulose (CMC), a gelatin or gelatin derivative, a protein or protein derivative, a hydrophilic synthetic polymer, a water-soluble microgel, a polystyrene sulfonate, poly(2-acrylamido-2-methylpropane-sulfonate), and a polyphosphate.

8. The article of any of embodiments 1 to 7 wherein the first and second discrete pores are independently at least 20 and up to and including 4,000 nm in average size.

9. The article of any of embodiments 1 to 8 wherein the one or more porous particles have a median mode particle size of at least 2 and up to and including 75 μm.

10. The article of any of embodiments 1 to 9 wherein the polymer is selected from the group consisting of a polyester, styrenic polymer, monoolefin polymer, vinyl ester polymer, α-methylene aliphatic monocarboxylic acid ester polymer, vinyl ether polymer, and vinyl ketone polymer.

11. The article of any of embodiments 1 to 10 wherein the one or more porous particles have an aspect ratio of less than 0.95.

12. The article of any of embodiments 1 to 11 wherein the one or more porous particles have an aspect ratio of at least 0.95 and down to 0.4.

13. The article of any of embodiments 1 to 12 wherein the one or more porous particles have an aspect ratio of as low as 0.1.

14. The article of any of embodiments 1 to 13 wherein the porous particles have a porosity of at least 10% and up to and including 50% based on the total porous particle volume.

15. The article of any of embodiments 1 to 14 that is a document having the one or more porous particles to provide authenticity.

16. The article of any of embodiments 1 to 15 wherein the coating containing the one or more porous particles is a coating comprising a varnish or ink.

17. A varnish or ink comprising one or more porous particles wherein each porous particle comprises a polymer that provides a continuous solid phase including an external particle surface, and at least first and second discrete pores that are isolated from each other and dispersed within the continuous solid phase, the first discrete pores comprising a first marker material, and the second discrete pores comprising a second marker material, which first and second marker materials are detectably different 18. A formed polymer or glass article that comprises one or more porous particles wherein each porous particle comprises a polymer that provides a continuous solid phase including an external particle surface, and at least first and second discrete pores that are isolated from each other and dispersed within the continuous solid phase, the first discrete pores comprising a first marker material, and the second discrete pores comprising a second marker material, which first and second marker materials are detectably different.

19. A method of labeling an article with detectable information comprising:

incorporating one or more porous particles into a material, or applying one or more porous particles to a substrate, wherein each porous particle comprises a polymer that provides a continuous solid phase including an external particle surface, and at least first and second discrete pores that are isolated from each other and dispersed within the continuous phase, the first discrete pores comprising a first marker material, and the second discrete pores comprising a second marker material, which first and second marker materials are detectably different.

20. The method of embodiment 19 wherein the one or more porous particles are applied to the substrate in a varnish or ink.

21. The method of embodiment 19 or 20 wherein the one or more porous particles are applied to the substrate in a paper or plastic label.

22. The method of any of embodiments 19 to 21 wherein the substrate is a paper or identification card.

23. The method of any of embodiments 19 to 22 wherein the one or more porous particles are introduced into the material or applied to the substrate in a pattern.

24. The method of any of embodiments 19 to 23 wherein the substrate is a fiber or fabric.

25. A system of detection comprising:

a detectable composition comprising one or more porous particles wherein each porous particle comprises a polymer that provides a continuous solid phase including an external particle surface, and first and second discrete pores that are isolated from each other and dispersed within the continuous solid phase, the first discrete pores comprising a first marker material, and the second discrete pores comprising a second marker material, which first and second marker materials are detectably different, and an instrument for detecting one or both of the first and second markers in the porous particles.

The following Examples are provided to illustrate the practice of this invention and are not meant to be limiting in any manner. In the following Examples:

The polyester resins, Kao E, Kao E-B, and Kao N were obtained from Kao Specialties Americas LLC, a part of Kao Corporation (Japan).

Carboxy methylcellulose, MW 250K (CMC1), was obtained from Acros Organics or from Ashland Aqualon as Aqualon 9M31F. These were interchangeably used.

Carboxy methylcellulose, low viscosity, MW80K (CMC2) and potassium hydrogen phthalate were obtained from Sigma-Aldrich Co.

Nalco™ 1060 colloidal silica was obtained from Nalco Chemical Company as a 50 weight % aqueous dispersion.

EFKA 6225, a fatty acid modified polyester, used as a shape control agent was obtained from Ciba Specialty Chemicals.

The shape control agent, poly(2-ethyl-2-oxazoline), was obtained from Aldrich.

The marker materials used were cyan and magenta pigments. The cyan (C) pigment PB 15:3 (Sunfast Blue 15:3) was obtained from Sun Chemicals. The magenta (M) pigment PR 122 (Toner Magenta E02) was obtained from Clariant. These pigments were milled in water using dispersants prior to incorporation in the first and second aqueous phases. The cyan "millgrind" (CM1) was made using Solsperse® 43000 (30 weight % with respect to pigment) as the dispersant at 18 weight % of pigment. The magenta "millgrind" (MM1) was made using Disperbyk 190 (25 weight % with respect to pigment) as the dispersant at 16 weight % of pigment.

Other aqueous dispersions of pigments were obtained from Cabot Corporation. Cabot IJX 253M (CM2, 20 weight % of pigment) is a dispersion of PB15:4 and Cabot IJX 462M (MM2, 20 weight % of pigment) is dispersion of PR 122. These pigments were also milled in ethyl acetate for incorporation in the oil phase of the emulsion. The cyan "millgrind" (CM3, 21.5 weight % pigment) was made using Solsperse® 32000 and Solsperse® 12000 as dispersants (25 and 6 weight %, respectively, with respect to pigment). The magenta "millgrind" (MM3, 19 wt % pigment) was made using Solsperse® 35000 as the dispersant (50 weight % with respect to pigment).

Resin master batches of the pigments were prepared by compounding each pigment with Kao E at a 40/60 weight ratio. The cyan master batch (CMB1) contained PB 15:3 and the magenta master batch (MMB1) contained PR122.

The aqueous cyan dye (CD1, 10 weight % dye), Duasynjet Cyan FRL-SF liquid, was obtained from Clariant Corporation. The aqueous magenta dye (MD1, 10 weight % dye), Ilford M-377, was obtained from Ilford (Australia).

The iron oxide particles, Toda CSF 4085V2, were obtained from Toda Kogyo Corporation. The dispersant for the iron oxide, Dequest® 2006 Anti Cal #4, amino tri(methylene phosphonic acid) pentasodium salt, was obtained from Thermphos International Ltd. An aqueous millgrind (IM) of the iron oxide particles (25 weight %) was made by milling them in water containing 1 weight % of the dispersant with respect to the iron oxide.

The size and shape of the porous particles were measured using a Sysmex FPIA-3000 automated particle shape and size analyzer from Malvern Instruments. In this method samples pass through a sheath flow cell that transforms the particle suspension into narrow or flat flow, ensuring that the largest area of the particle is oriented towards the camera and that all particles are in focus. The CCD camera captures 60 images every second and these are analyzed in real time. Numerical evaluation of particle shape is derived from measurement of the area of the particle. A number of shape factors are calculated including circularity, aspect ratio, and circle equivalent diameter. Aspect ratio is defined as described above. The reported size of the particles is the mode value of the distribution.

The porosity of the porous particles was measured using mercury intrusion porosimetry.

To further characterize the distribution of pore sizes within a given porous particle, representative scanning electron micrographs were taken of fractured porous particles and simple image analysis routines were used to first identify the pores within the porous particles and then to measure the diameter of the pores. A commercial statistical analysis software package was then used to study the distribution of the pores within the particles. The porous particles prepared according to this invention were evaluated using optical microscopy at both 600× and 1000× magnification for visualizing the marker materials in the discrete pores.

The solid and porous polymer particles used in the Examples were made using the following procedures:

Control 1: Nonporous Particle Containing 2 Weight % Cyan and Magenta Marker Materials An organic solvent (oil) phase was prepared using 200 g of a 17 weight % solution of Kao N in ethyl acetate mixed with 1.86 g of the cyan millgrind (CM3) and 2.06 g of the magenta millgrind (MM3). This organic phase was emulsified into an aqueous phase prepared with 207 g of distilled water, 1.38 g of potassium hydrogen phthalate, and 8.67 g of Nalco™ 1060 using a Silverson L4R Mixer (Silverson Machines, Inc.), followed by homogenization in a Microfluidizer® (Model #110T from Microfluidics) at 9800 psi. The resulting oil-in-water emulsion was diluted 1:1 with a solution of water containing 0.03 weight % of poly(2-ethyl-2-oxazoline). The ethyl acetate was removed under reduced pressure using a rotary evaporator. The resulting blue-colored particles were isolated by filtration using a fritted glass funnel, washed with water, and dried at room temperature. The resulting particles had a mode particle size of 14.6 μm and an AR of 0.635. The blue-colored particles showed no separate domains of color and no porosity.

Control 2: Porous Particles Containing 4 Weight % of 2 Mixed (Cyan and Magenta) Marker Materials in all the Pores An organic solvent (oil) phase was prepared using 98.5 g of an 18 weight % solution of Kao N and 0.2 weight % of EFKA 6225 in ethyl acetate. This oil phase was emulsified with an aqueous phase containing 15 g of a 4 weight % solution of CMC1, 5 g of a magenta pigment millgrind (MM1), and 4.4 g of a cyan pigment millgrind (CM1), using the Silverson Mixer followed by homogenization in the Microfluidizer® at 9800 psi. To a 50 g aliquot of the resulting water-in-oil emulsion were added 50 g of a 14 weight % solution of Kao N in ethyl acetate followed by 0.08 g of EFKA 6225 with gentle mixing. A 100 g aliquot of this emulsion was emulsified with a water phase consisting of 162 g of a 200 mmolar citrate phosphate buffer at pH 4 and 5 g of Nalco 1060 using the Silverson Mixer fitted with a General-Purpose Disintegrating Head for two minutes at 2000 RPM, followed by homogenization in an orifice disperser at 1000 psi to form a water-in-oil-in-water emulsion. This emulsion was then diluted with an equal weight of water containing a 0.03 weight % solution of PEOX. The ethyl acetate was removed by evaporation using a Heidoiph Laborata rotary evaporator at 40° C. under reduced pressure. The resulting blue-colored particles were filtered through a glass fritted funnel, washed with distilled water, and dried under ambient conditions. These particles had a mode particle size of 15.8 μm and an AR of 0.595, and a porosity of 34.2%. The blue-colored particles had no separate domains of cyan and magenta markers.

Invention Example 1

Porous Particles Containing Cyan and Magenta Marker Materials (4 weight %) in Separate Discrete Pores A first organic phase (563 g) containing 18.3 weight % of Kao N and 0.2 weight % of EFKA 6225 in ethyl acetate was emulsified with the first aqueous phase prepared with 134 g of a 2.5 weight % of CMC1 and 51 g of the CM1 using the Silverson Mixer followed by homogenization in the Microfluidizer® at 9800 psi to give a first cyan water-in-oil emulsion. A second water-in-oil emulsion was prepared with the second organic phase consisting of 563 g of an 18.3 weight % of Kao N and 0.2 weight % of EFKA 6225 in ethyl acetate, and the second aqueous phase containing 127 g of a 2.7 weight % solution of CMC1 and 58 g of MM1 in the same manner as the first water-in-oil emulsion. A 25 g aliquot of the first water-in-oil emulsion and a 25 g aliquot of the second water-in-oil emulsion were then added to 50 g of a 14 weight % solution of Kao N and 0.08 g of EFKA 6225 in ethyl acetate with gentle mixing. This mixture of first and second water-in-oil emulsions was then added to a third aqueous phase consisting of 161 g of a 200 mmolar citrate phosphate buffer at pH 4 and 5 g of Nalco 1060 using the Silverson Mixer fitted with a General-Purpose Disintegrating Head for two minutes at 2000 RPM, followed by homogenization in an orifice disperser at 1000 psi to form a water-in-oil-in-water emulsion. This emulsion was then diluted with an equal weight of water containing a 0.03 weight % solution of PEOX. The ethyl acetate was evaporated using a Heidolph Laborata rotary evaporator at 40° C. under reduced pressure. The resulting suspension of beads was filtered through a glass fitted funnel and the particles were washed with distilled water and dried under ambient conditions. The resulting porous particles had a mode particle size of 14.2 μm and an AR of 0.755 and had a porosity of 32.1%. The purple-colored particles had distinct cyan and magenta markers in separate discrete pores unlike the particles prepared for Control 2 where the two marker pigments were in the same pores.

Invention Example 2

Porous Articles Containing Cyan and Magenta Marker Materials (8 weight %) in Separate Discrete Pores Porous particles of this invention were prepared as described in Invention Example 1 except that a 300 g aliquot of the first water-in-oil emulsion was added to a 300 g aliquot of the second water-in oil-emulsion with gentle mixing. This mixture of first and second water-in-oil emulsions was then added to a third aqueous phase containing 980 g of the citrate phosphate buffer and 20 g of Nalco 1060. The homogenization, solvent evaporation, and isolation of the porous particles were carried out as described in Invention Example 1. The resulting porous particles had a mode particle size of 11 μm and an AR of 0.915, and a porosity of 39.6%. The purple-colored porous particles had distinct cyan and magenta markers in separate discrete pores.

Invention Example 3

Porous Particles Containing Cyan and Magenta Marker Materials (0.25 weight %) in Separate Discrete Pores and Having a very Few Pores Porous particles of this invention were prepared as described in Invention Example 1 except that a 1.56 g aliquot of the first water-in-oil emulsion was mixed with an equal amount of the second water-in oil-emulsion and added to 96.4 g of a 14 weight % solution of Kao N and 0.19 g of EFKA 6225 in ethyl acetate with gentle mixing. The resulting porous particles had a mode particle size of 18 μm and an AR of 0.675, and a porosity of 5.4%. The purple-colored porous particles had distinct cyan and magenta markers in separate discrete pores and were very easily visible in an optical microscope at 100× magnification.

Invention Example 4

Porous Particles Containing Cyan and Magenta Marker Materials (4 weight %) in Separate Discrete Pores and No Marker Materials in Other Pores Porous particles of this invention were prepared as described in Invention Example 1 except that an additional water-in-oil emulsion was prepared using an additional organic phase containing 100 g of a 20 weight % solution of Kao N and 0.2 weight % of EFKA 6225 in ethyl acetate, and an additional aqueous phase containing 30 g of a 1.9 weight % solution of CMC1. To 50 g of this additional water-in-oil emulsion were added 25 g of each of the first and second water-in-oil emulsions as prepared in Invention Example 1. The resulting mixture was added to the third aqueous phase as in Invention Example 1 following the same procedure as described therein. The resulting porous particles had a mode particle size of 15.8 μm and an AR of 0.820, and had a porosity of 44.3%. The purple-colored porous particles had distinct cyan and magenta markers in separate discrete pores and other distinct pores with no markers in them.

Invention Example 5

Porous Articles Containing Magnetic and Cyan (Non-Magnetic) Markers (6 weight %) in Separate Discrete Pores A first cyan water-in-oil emulsion was prepared as described in Invention Example 1. A second water-in-oil emulsion was prepared also as described in Invention Example 1 except that the second organic phase consisted of 99 g of a 19 weight % solution of Kao N and 0.2 weight % of EFKA 6225 in ethyl acetate, and the second aqueous phase consisted of 31 g of a 1.9 weight % solution of CMC1 and 3.1 g of IM. A 50 g aliquot of the first water-in-oil emulsion and a 50 g aliquot of the second water-in-oil emulsion were mixed gently using a glass rod. The resulting mixture was added to the third aqueous phase as in Invention Example 1 following the same procedure as described therein. The resulting porous particles had a mode particle size of 15.4 μm and an AR of 0.925, and a porosity of 45.6%. The bluish brown-colored porous particles had distinct cyan and magnetic markers in separate discrete pores. The porous particles were found to be responsive to a magnetic field.

Invention Example 6

Spherical Porous Particles Containing Cyan and Magenta Marker Materials (4 weight %) in Separate Discrete Pores of 2 Different Sizes A first organic phase (322 g) containing 19.4 weight % of Kao E-B in ethyl acetate was emulsified with the first aqueous phase prepared with 102 g of a 1.9 weight % of CMC1 and 12.8 g of CMC2 as described in Invention Example 1. A second water-in-oil emulsion was prepared with the second organic phase consisting of 322 g of a 19.4 weight % of Kao E-B in ethyl acetate, and the second aqueous phase containing 102 g of a 1.9 weight % solution of CMC2 and 12.8 g of MM2 in the same manner as the first water-in-oil emulsion. A 162.5 g aliquot of each of the first and second water-in-oil emulsions were mixed together gently and added to the third aqueous phase consisting of 516 g of a 200 mmolar citrate phosphate buffer at pH 4 and 25 g of Nalco 1060, emulsified, and processed as described in Invention Example 1. The resultant porous particles had a mode particle size of 6.4 μm and an AR of 0.965. The particles were fractured and examined by Scanning Electron Microscopy and found to have bimodal pores. The mode particle size of the larger pores was 1.0 μm and the mode particle size of the smaller pores was 0.35 μm. The purple-colored porous particles had distinct cyan and magenta markers in separate discrete pores.

Invention Example 7

Porous Particles Containing Cyan and Magenta Dyes (1 weight %) in Separate Discrete Pores Porous particles of the present invention were made as described in Invention Example 1 except that CD1 and MD1 were used in place of CM1 and MM1, and a 12.5 g aliquot of each of the first and second water-in-oil emulsions was added to 75 g of a 14 weight % solution of Kao N and mixed gently before addition to the third aqueous phase. The water-in-oilin water emulsion was not diluted with water prior to evaporation of the organic solvent. The resulting particles had a mode particle size of 15 μm and an AR of 0.935, and a porosity of 26.8%. The purple-colored porous particles had distinct cyan and magenta markers in separate discrete pores. Upon heating the dried porous particles to above 100° C., the dyes were released from the pores and the pores became clear and not distinct.

Control 3: Spherical Non-Porous Toner Particle Containing 6 Weight % Cyan and Magenta Marker Materials These particles were prepared as described for Control 1 except CMB1 and MMB2 were used in place of CM3 and MM3 and Kao E-B was used in place of Kao N. The oil-in-water emulsion was not diluted with an equal amount of water prior to removal of the organic solvent. The colloidal surface silica was removed by raising the pH of the slurry to 12 for 30 minutes before filtering and drying the particles. The resulting blue-colored particles had a mode particle size of 7 μm and an AR of 0.965, but no porosity and showed no separate colored domains (pores).

Invention Example 8

Spherical Porous Toner Particle with 4 Weight % Cyan and Magenta Marker Material in Separate Discrete Pores Porous particles of this invention were prepared as described in Invention Example 2 except CM2 and MM2 were used in place of CM1 and MM1 and Kao E-B was used in place of Kao N. The water-in-oil-in-water emulsion was not diluted with an equal amount of water prior to evaporation of the organic solvent. The colloidal surface silica was removed by raising the pH of the slurry to 12 for 30 minutes before filtering and drying the particles. The resulting porous particles had a mode particle size of 4 μm and an AR of 0.955, and a porosity of 22%.

To generate images containing single porous particles prepared in Control 3 and Invention Example 8, a MECCA Device (Magnetic, Electrostatic, Charge, and Concentration Apparatus) was used. This device, which was originally developed to measure the tribocharging characteristics of toners, generates a unique toner deposit that possesses a crown-shaped laydown. The center of the deposit possesses a high laydown of toner, but the laydown decreases significantly from the center to the edge of the deposit. The edges of the deposit have primarily individual toner particles that are adhered electrostatically to the support (for example, paper support). The toner images were then placed in an air oven at 130° C. for 15 minutes. After allowing the baked deposits to cool, optical micrographs were taken of isolated particles in each deposit.

Figure 1:
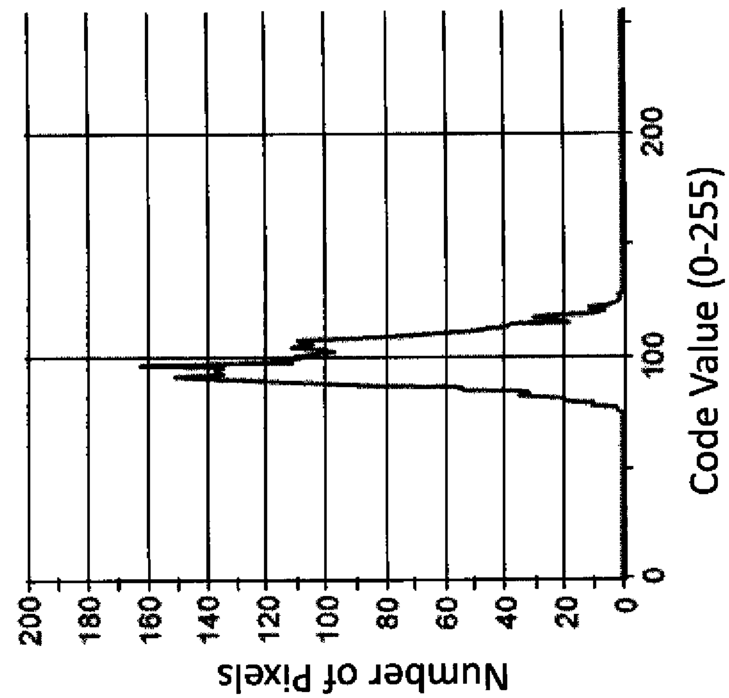
FIG. 1 is a graphical histogram for an individual porous particle prepared in Control 3 below.

Simple image analysis techniques were used to further demonstrate the presence of cyan and magenta marker materials in discrete pores of the porous particles prepared in both Control 3 and Invention Example 8. Histograms of each deposit sample are shown in FIGS. 1 (Control 3) and 2 (Invention Example 8). The histogram of an individual porous particle shown in FIG. 2 is broader, which is consistent with a broad population of densities in the porous particle. The histogram for the individual particle of Control 3 is narrower and shifted to lower code values. This information along with simple observation led us to understand that the marker materials in the porous particles used in the invention were in different (discrete) pores unlike the marker materials in the Control 3 non-porous particles that were not in discrete pores, but typically in the same particle.

Invention Example 9

This example demonstrates the use of the porous particles of this invention for security applications by making and using thin film coatings containing porous particles having distinct cyan and magenta marker material in separate discrete pores.

Some of the porous particles described in the above Invention Examples and Control 1 were dispersed as a dry powder in a commercial lacquer using a touch activated vibrating shaker for a couple of minutes. The resulting mixture was then coated onto a paper substrate using a Flexi Proofer, consisting of an anilox roller (145 lines per inch, 368 lines per cm), doctor blade, and rubber transfer roller. For water-based lacquers, the coatings were then dried at room temperature to remove the water. In the case of the UV-cured lacquers, after coating onto the substrate as described above, the coatings were then passed through a Fusion UV Systems P300MT at a speed of 100 feet (254 cm) per minute to harden the coatings.

Using microscopy as described above, the coatings were examined to ascertain the ease of visual distinction of first and second markers in discrete pores. No observable distinction between the cyan and magenta markers could be seen in the coatings containing the non-porous particles of Control 1. Rather, all of the markers in the particles appeared dark blue. For the coatings prepared using the porous particles of Invention Example 2, distinct domains containing cyan and magenta markers could be seen. Some slight overlapping of the markers was also observed due to the spherical nature of the porous particles. On the other hand, the coatings containing the porous particles of Invention Examples 1 and 3 showed distinct (separated) domains of cyan and magenta markers that were also very easily discernible due to their non-spherical nature. Among these coatings, the coatings using Invention Example 3 showed the biggest distinction between the discrete pores containing cyan and magenta markers due to the reduced number of pores in addition to the non-spherical shape of the porous particles.

The invention has been described in detail with particular reference to certain preferred embodiments thereof, but it will be understood that variations and modifications can be effected within the spirit and scope of the invention.

The invention claimed is:

1. An article that comprises one or more porous particles wherein each porous particle comprises a polymer that provides a continuous solid phase including an external particle surface, and at least first and second discrete pores that are isolated from each other and dispersed within the continuous solid phase, and each porous particle further comprising a first marker material that is present within only the volume of the first discrete pores, and a second marker material that is present within only the volume of the second discrete pores, which first and second marker materials are detectably different the porous particle having a mode particle size of at least 2 μm and up to and including 75 μm.

2. The article of claim 1 that is a fabric, label, film, fiber, paper or plastic card, paperstock, packaging component, or polymer, ceramic, or glass article.

3. The article of claim 1 comprising a coating composition comprising the one or more porous particles.

4. The article of claim 1 wherein the first and second marker materials are independently selected from the groups consisting of colored pigments or inks, fluorescing materials, radioisotopes, luminescing compounds, particles of metal or metal-containing compounds having a magnetic moment, and bioactive materials.

5. The article of claim 1 wherein the porous particle further comprises additional discrete pores besides the first and second discrete pores.

6. The article of claim 5 wherein at least some of the additional discrete pores are empty of marker materials.

7. The article of claim 1, wherein each of the porous particles further comprises first and second discrete pore stabilizing hydrocolloids within the volume of the first and second discrete pores, respectively, wherein the first and second discrete pore stabilizing hydrocolloids are the same or different and are independently selected from the group consisting of carboxymethyl cellulose (CMC), a gelatin or gelatin derivative, a protein or protein derivative, a hydrophilic synthetic polymer, a water-soluble microgel, a polystyrene sulfonate, poly(2-acrylamido-2-methylpropanesulfonate), and a polyphosphate.

8. The article of claim 1 wherein the first and second discrete pores independently have an average size of at least 20 nm and up to and including 4,000 nm.

9. The article of claim 1 wherein the polymer is selected from the group consisting of a polyester, styrenic polymer, monoolefin polymer, vinyl ester polymer, $\alpha$-methylene aliphatic monocarboxylic acid ester polymer, vinyl ether polymer, and vinyl ketone polymer.

10. The article of claim 1 wherein the one or more porous particles have an aspect ratio of less than 0.95.

11. The article of claim 1 wherein the one or more porous particles have an aspect ratio of at least 0.95 and down to 0.4.

12. The article of claim 1 wherein the one or more porous particles have an aspect ratio of as low as 0.1.

13. The article of claim 1 wherein the porous particles have a porosity of at least 10% and up to and including 50% based on the total porous particle volume.

14. The article of claim 1 that is a document having the one or more porous particles to provide authenticity.

15. The article of claim 1 comprising a coating containing the one or more porous particles, which coating is a varnish or ink.

16. A varnish or ink comprising one or more porous particles, wherein each porous particle comprises a polymer that provides a continuous solid phase including an external particle surface, and at least first and second discrete pores that are isolated from each other and dispersed within the continuous solid phase, and each porous particles further comprising a first marking material that is present within only the volume of the first discrete pores, and a second marking material that is present within only the volume of the second discrete pores, which first and second marker materials are detectably different the porous particle having a mode particle size of at least 2 μm and up to and including 75 μm.

17. A formed polymer or glass article that comprises one or more porous particles, wherein each porous particle comprises a polymer that provides a continuous solid phase including an external particle surface, and at least first and second discrete pores that are isolated from each other and dispersed within the continuous solid phase, and each porous particle further comprises a first marking material that is present within only the volume of the first discrete pores, and a second marking material that is present within only the volume of the second discrete pores, which first and second marker materials are detectably different the porous particle having a mode particle size of at least 2 μm and up to and including 75 μm.

18. A system of detection comprising:

a detectable composition comprising one or more porous particles, wherein each porous particle comprises a polymer that provides a continuous solid phase including an external particle surface, and first and second discrete pores that are isolated from each other and dispersed within the continuous solid phase, each porous particle further comprises a first marking material that is present within only the volume of the first discrete pores, and a second marking material that is present within only the volume of the second discrete pores, which first and second marker materials are detectably different, and an instrument for detecting one or both of the first and second markers in the porous particles the porous particle having a mode particle size of at least 2 μm and up to and including 75 μm.

* * * * *